United States Patent
Uchida (10) Patent No.: US 6,836,665 B2
(45) Date of Patent: Dec. 28, 2004

(54) MOBILE UNIT COMMUNICATION SYSTEM AND A MOBILE UNIT COMMUNICATION METHOD THAT CAN INCREASE THE EFFICIENCY OF AN ASSIGNMENT OF A CHANNEL OF A COMMUNICATION IN WHICH A DATA HAVING A LARGE DATA AMOUNT IS TRANSMITTED AT A HIGH SPEED

(75) Inventor: Wataru Uchida, Tokyo (JP)

(73) Assignee: NEC Corporation, Tokyo (JP)

( * ) Notice: Subject to any disclaimer, the term of this patent is extended or adjusted under 35 U.S.C. 154(b) by 581 days.

(21) Appl. No.: 09/888,407

(22) Filed: Jun. 26, 2001

(65) Prior Publication Data

US 2001/0055973 A1 Dec. 27, 2001

(30) Foreign Application Priority Data

Jun. 27, 2000 (JP) .................................. 2000-192959

(51) Int. Cl.[7] .................................................. H04Q 7/20
(52) U.S. Cl. .................. 455/450; 455/452.1; 455/452.2
(58) Field of Search ......................... 455/450, 452.1, 455/452.2, 466, 509, 464; 370/352, 247, 328, 338

(56) References Cited

U.S. PATENT DOCUMENTS

| | | | | |
|---|---|---|---|---|
| 5,548,805 A | * | 8/1996 | Shpantzer et al. | .......... 455/454 |
| 5,793,762 A | * | 8/1998 | Penners et al. | .......... 370/389 |
| 6,470,004 B1 | * | 10/2002 | Murata | .......... 370/347 |
| 6,574,211 B2 | * | 6/2003 | Padovani et al. | .......... 370/347 |
| 6,690,925 B1 | * | 2/2004 | Yoshihara | .......... 455/200.1 |
| 6,708,035 B1 | * | 3/2004 | Gonzalez De Prado | .......... 455/446 |

FOREIGN PATENT DOCUMENTS

| | | |
|---|---|---|
| JP | 2-274131 | 11/1990 |
| JP | 2650536 | 5/1997 |
| JP | 9-130324 | 5/1997 |
| JP | 11-262049 | 9/1999 |
| JP | 11-275654 | 10/1999 |
| JP | 2000-59333 | 2/2000 |
| JP | 2000-152326 | 5/2000 |
| WO | WO99/31823 | 6/1999 |

* cited by examiner

*Primary Examiner*—Jean Gelin
(74) *Attorney, Agent, or Firm*—Foley & Lardner LLP (57) ABSTRACT

A mobile unit communication system, includes a mobile unit; and a base station. The mobile unit includes: a terminal transmit unit transmitting an upward data to the base station; a terminal receive unit receiving a downward data from the base station; and an upward data amount calculating unit calculating an upward data amount of the upward data. The base station includes: a base station receive unit receiving the upward data; a base station transmit unit transmitting the downward data to the mobile unit; and a detecting unit detecting the upward data amount. The base station allocates upward additional channels of the numbers corresponding to the upward data amount detected by the detecting unit in addition to a base channel to the mobile unit.

15 Claims, 7 Drawing Sheets

MOBILE UNIT COMMUNICATION SYSTEM AND A MOBILE UNIT COMMUNICATION METHOD THAT CAN INCREASE THE EFFICIENCY OF AN ASSIGNMENT OF A CHANNEL OF A COMMUNICATION IN WHICH A DATA HAVING A LARGE DATA AMOUNT IS TRANSMITTED AT A HIGH SPEED

BACKGROUND OF THE INVENTION

1. Field of the Invention

The present invention relates to a mobile unit communication system and a mobile unit communication method. More particularly, the present invention relates to a mobile unit communication system and a mobile unit communication method that can increase the efficiency of an assignment of a channel of a communication in which a data having a large data amount is transmitted at a high speed.

2. Description of the Related Art

A system referred to as IMT-2000, which has a high speed and a large capacity, is considered as a next generation of a mobile unit communication system. It is also the case that its data speed is up to 2 Mbps, and a dynamic picture can be transmitted. Such a next generation system is a high speed system, which can not be compared with the conventional mobile system. However, if all mobile terminals reserve the maximum data speed, a channel between air blocks is immediately used at a full condition. So, another user can not use the system. Thus, it is desirable that the data transmission can be effectively carried out at a high speed without any obstacle to the usage of another user.

Japanese Patent Publication No.2650536 discloses the following communication apparatus. This communication apparatus is provided with: a communication data transmitter/receiver using a directional antenna; a searcher for controlling the directional antenna so as to search for any another communicable mobile unit; a data receiver having a non-directional antenna for receiving a communication data from a transmission partner; a self-position detector for detecting a position of a mobile unit on a ground; a communication region calculator for calculating a communication region from the reception data and the map data of the communication data transmitter/receiver and the data receiver, and the self-position data of the output from the self-position detector; a communication route selection calculator for determining the optimal communication route from the communication region; and a display for displaying the communication region and the communication route.

Japanese Laid Open Patent Application (JP-A-Heisei, 11-262049) discloses the following communication system using a mobile unit. This communication system using a mobile unit is provided with: laser communicators for carrying out laser communications, which are installed correspondingly to a plurality of dispersed mobile units; and a plurality of radio communication apparatuses each having a radio communicator for carrying out a radio communication using a frequency lower than that of this laser communication. Each of the plurality of communication apparatuses is provided with: a partner information obtainer, which is connected between the plurality of radio communication apparatuses through a carrier wave via the radio communication, and obtains a partner information including a position speed information of the plurality of mobile units serving as communication partners, and then reports a self-information including a position speed information of a self-apparatus to a radio communication apparatus of a communication partner; and a data transmitter, which is connected between the plurality of radio communication apparatuses through the carrier wave via the laser communication, on the basis of the partner information obtained by this partner information obtainer, and then transmits a data generated by a radio communication apparatus on one side through the carrier wave via the laser communication to a radio communication apparatus on the other side.

Japanese Laid Open Patent Application (JP-A-Heisei, 11-275654) discloses the following data communication terminal connection method. The data communication terminal connection method is provided with: a terminal for inputting/outputting a data; a plurality of mobile stations; a controller for controlling a transmission of a generation signal from the terminal to the plurality of mobile stations; and a partner terminal for performing a data link on the plurality of mobile stations. The controller carries out a line connection between the terminal and the partner terminal, on the basis of a bulk connection information.

Japanese Laid Open Patent Application (JP-A-Heisei, 9-130324) discloses the following digital radio communication apparatus.

This digital radio communication apparatus provides a radio communication method of establishing a radio line connection between a radio base station and a plurality of mobile terminals, and in a radio access method of simultaneously assigning a plurality of radio circuits between a radio data terminal and the radio base station on the basis of a data transmission speed of the mobile terminal, and carrying out an access of a data transmission speed equal to plural times the data transmission speed of the radio line, it has a multiplex separation circuit, which in a radio base station constituted by a radio base station (CS) placed in a micro cell and a mobile station (PS) within a micro cell where the radio base station can carry out a communication, performs a serial parallel conversion on a downward transmission data signal transmitted from a network to the mobile station, separates into a plurality of transmission data speeds, transmits to radio lines of a plurality of lines, performs a parallel serial conversion on a plurality of upward transmission data signals that are separated and transmitted by the mobile station, and then performs an interface on a signal speed of a network, and on a transmission side, it is composed of: a bit addition circuit for adding a channel identifier (CI) to each transmission data signal of the outputs from the multiplex separation circuits in a plurality of systems on which the serial parallel conversion is performed; a bit inversion circuit for inverting the predetermined bits determined by the radio line among the plurality of channel identifier (CI) bits so that they are different in a plurality of radio line transmission data signals; an error correction encoder for encoding the transmission data signal and the channel identifier (CI) bit as an information bit; a bit inversion circuit for inverting the inverted channel identifier (CI) bit and returning back to the original state; a TDMA circuit for carrying out the multiplex separation in time division as a radio modification signal; a transmission/reception circuit for modulating/demodulating the transmission data signal, converting into a radio signal and transmitting it; and an antenna, and on a reception side, it is composed of: an antenna and a transmission/reception circuit for carrying out the reception from the plurality of radio lines; a bit inversion circuit for inverting any bit among the channel identifier (CI) bits of the reception data signals in the plurality of radio lines; a switcher for selecting and outputting a data signal with regard to a presence or absence of a bit inversion; a CRC error correction decoder; a bit separation circuit for separating the channel identifier (CI) bits; a switching circuit for switching and outputting the input data signals in a plurality of systems; a multiplex separation circuit for sequentially selecting a plurality of data signals and performing the parallel serial conversion on a data speed of a terminal; and a control circuit for controlling the selection in the switching circuit on the basis of a presence or absence of a CRC error correction pulse. It repeats the trial of a bit inversion for all combinations of bit inversion positions at which the channel identifier (CI) bits of the reception data in the plurality of lines are inverted on the transmission side. Then, it determines the rank in the plurality of outputs from the transmission side multiple separation circuit, on the basis of the combination in which there is no error detection pulse in the error correction decoder, then rearranges the signals after the bit separation into the order after the branch in the transmission side multiplex separation circuit. Then, the parallel serial conversion in the multiplex separation circuit causes it to be multiplexed and converted into the original data signal row.

Japanese Laid Open Patent Application (JP-A-Heisei, 2-274131) discloses the following mobile radio communication system transmission control method. This mobile radio communication system transmission control method, in a mobile radio communication system including one control station and a plurality of radio stations, in which the control station carries out a line control between the respective radio stations through a control channel and also relays data communication between the respective radio stations through a communication channel, has, in each of the radio stations, a line quality detector for detecting a line quality from a signal transmitted through the control channel from the control station at a time of a line control, and a transmission speed setter for selecting a transmission speed corresponding to the line quality detected by the line quality detector from a plurality of kinds of prepared transmission speeds, and then setting for the communication channel.

SUMMARY OF THE INVENTION

The present invention is accomplished in view of the above mentioned problems. Therefore, an object of the present invention is to provide a mobile unit communication system and a mobile unit communication method, which can effectively carry out a data transmission at a high speed without any obstacle to a usage of another user.

In order to achieve an aspect of the present invention, a mobile unit communication system, includes: a mobile unit; and a base station, and wherein the mobile unit includes: a terminal transmit unit transmitting an upward data to the base station; a terminal receive unit receiving a downward data from the base station; and an upward data amount calculating unit calculating an upward data amount of the upward data, and wherein the base station includes: a base station receive unit receiving the upward data; a base station transmit unit transmitting the downward data to the mobile unit; and a detecting unit detecting the upward data amount, and wherein the base station allocates upward additional channels of the numbers corresponding to the upward data amount detected by the detecting unit in addition to a base channel to the mobile unit.

In this case, the mobile unit further includes a telegraphic message generating unit generating an upward and upward additional channel request telegraphic message to request to allocate the additional channel, and wherein the terminal transmit unit transmits the upward and upward additional channel request telegraphic message to the base station.

Also in this case, the base station includes a table in which the numbers of the additional channels is determined in reference to the numbers of remaining channels and the upward data amount.

Further in this case, the additional channels are opened after the upward data is transmitted to the base station.

In this case, the base station further includes an internet transmission reception unit connecting to the internet to receive the downward data from the internet, and wherein the detecting unit detects an downward data amount of the downward data received from the internet.

Also in this case, the base station allocates downward additional channels allocated based on the downward data amount in addition to the base channel to the mobile unit.

Further in this case, the base station includes a downward table in which the numbers of the downward additional channels is determined in reference to the numbers of remaining channels and the downward data amount.

In this case, the mobile unit further includes a telegraphic message generating unit generating an upward and upward additional channel request telegraphic message to request to allocate the additional channel, and wherein the terminal transmit unit transmits the upward and upward additional channel request telegraphic message to the base station.

Also in this case, the base station includes an upward table in which the numbers of the additional channels is determined in reference to the numbers of remaining channels and the upward data amount.

Further in this case, the downward table is a same as the upward table.

In order to achieve another aspect of the present invention, a mobile unit communication method, includes: (a) transmitting of an mobile unit an upward data amount of an upward data transmitted from the mobile unit to a base station, to the base station; (b) allocating of the base station upward channels of the numbers corresponding to the upward data amount in addition to a base channel to the mobile unit; and (c) transmitting of the mobile unit the upward data with the upward channels to the base station.

In this case, the (b) is not performed when the upward data amount is equal to or less than a threshold.

Also in this case, the mobile unit communication method further includes: (d) allocating of the base station downward channels of the numbers corresponding to a downward data amount of a downward data transmitted from the base station to the mobile unit in addition to a base channel, to the mobile unit; and (e) transmitting of the base station the downward data with the downward channels to the mobile unit.

Further in this case, the (d) is not performed when the downward data amount is equal to or less than a threshold.

In order to achieve still another aspect of the present invention, a mobile unit communicating with a base station, includes: a terminal transmit unit transmitting an upward data to the base station; a terminal receive unit receiving a downward data from the base station; and an upward data amount calculating unit calculating an upward data amount of the upward data, and wherein the base station detects the upward data amount, and wherein the base station allocates upward additional channels of the numbers corresponding to the upward data amount in addition to a base channel to the mobile unit.

In this case, the mobile unit communicating with a base station, further includes: a telegraphic message generating unit generating an upward and upward additional channel request telegraphic message to request to allocate the additional channel, and wherein the terminal transmit unit transmits the upward and upward additional channel request telegraphic message to the base station.

Also in this case, the additional channels are opened after the upward data is transmitted to the base station.

In order to achieve yet still another aspect of the present invention, a base station communicating with a mobile unit, includes: a base station receive unit receiving an upward data transmitted from the mobile unit; a base station transmit unit transmitting a downward data to the mobile unit; and a detecting unit detecting an upward data amount of the upward data, and wherein the base station allocates upward additional channels of the numbers corresponding to the upward data amount in addition to a base channel to the mobile unit.

In this case, the base station includes a table in which the numbers of the additional channels is determined in reference to the numbers of remaining channels and the upward data amount.

Also in this case, the base station further includes an internet transmission reception unit connecting to the internet to receive the downward data from the internet, and wherein the detecting unit detects an downward data amount of the downward data received from the internet.

DESCRIPTION OF THE PREFERRED EMBODIMENTS

Embodiments of the present invention will be described below in detail with reference to the attached drawings.

Figure 1:
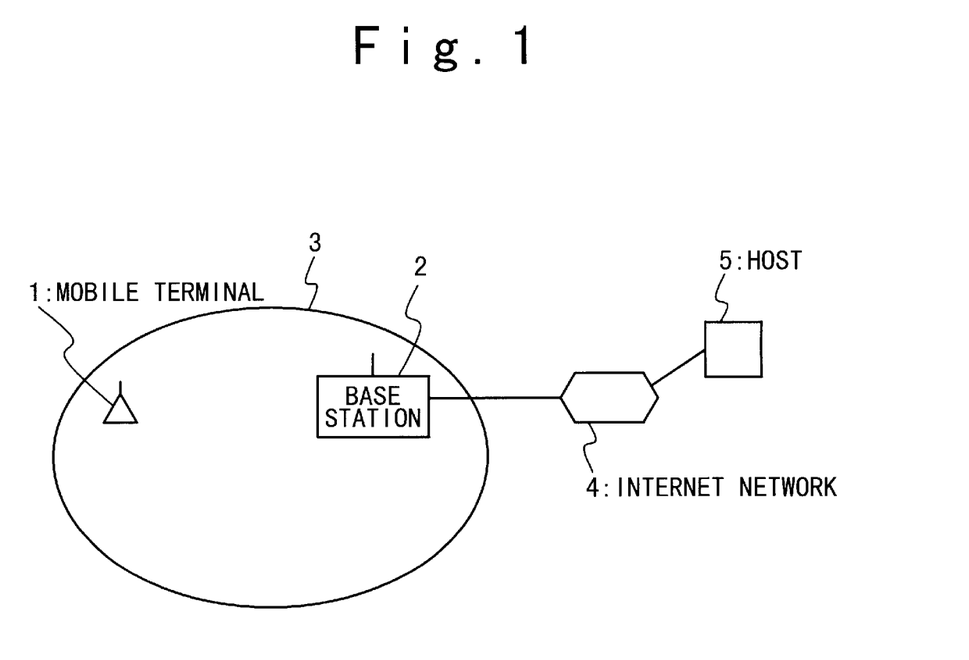
FIG. 1 is a system block diagram showing an embodiment of a mobile unit communication system according to the present invention.

An embodiment of a mobile unit communication system according to the present invention, a mobile terminal is movably positioned together with a base station in a service zone. A mobile terminal 1 is positioned in a service zone 3 containing a base station 2, as shown in FIG. 1. The base station 2 is connected to an Internet network 4. A HOST 5 is connected to the Internet network 4.

Figure 2:
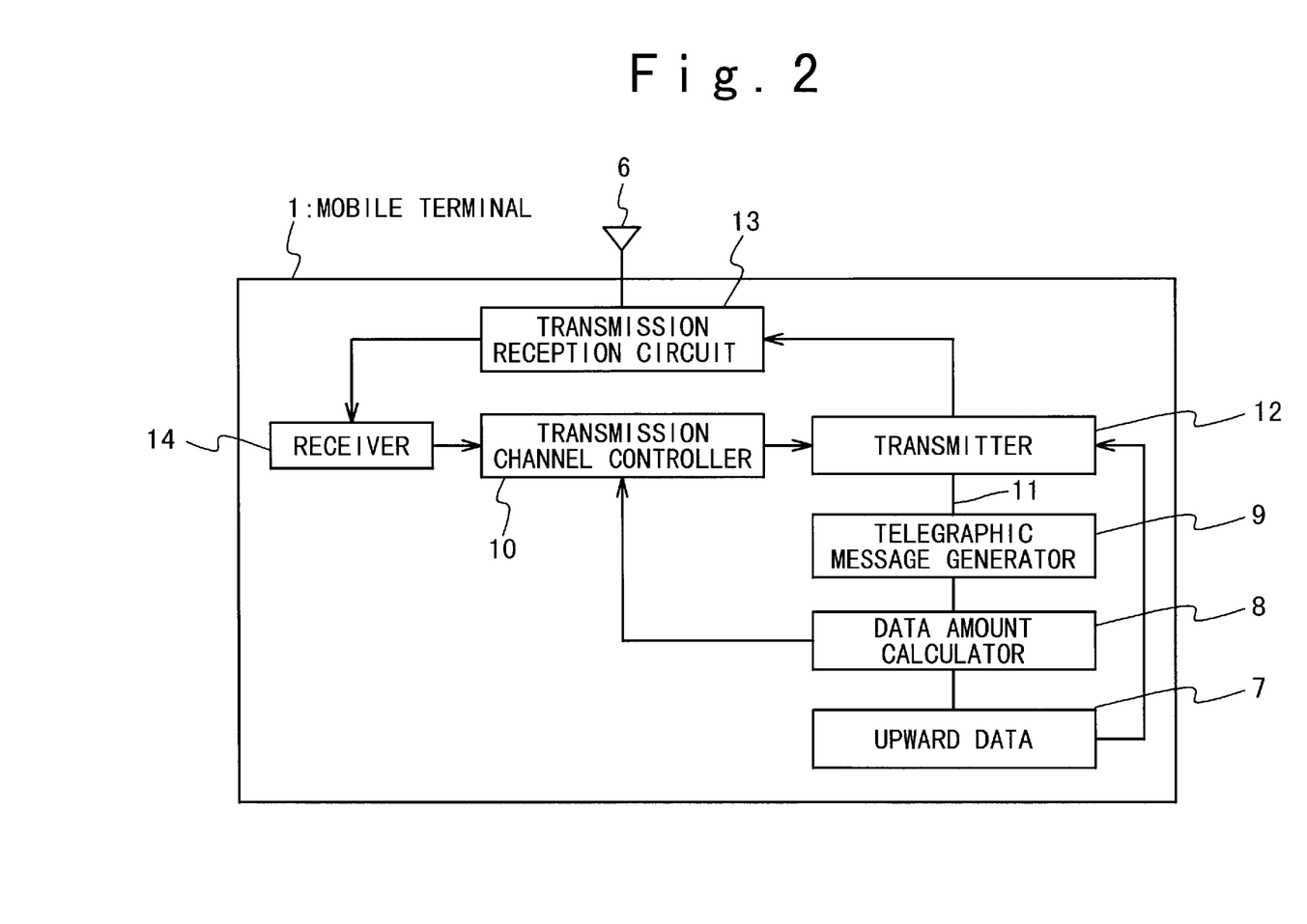
FIG. 2 is a circuit block diagram showing a mobile terminal.
Figure 3:
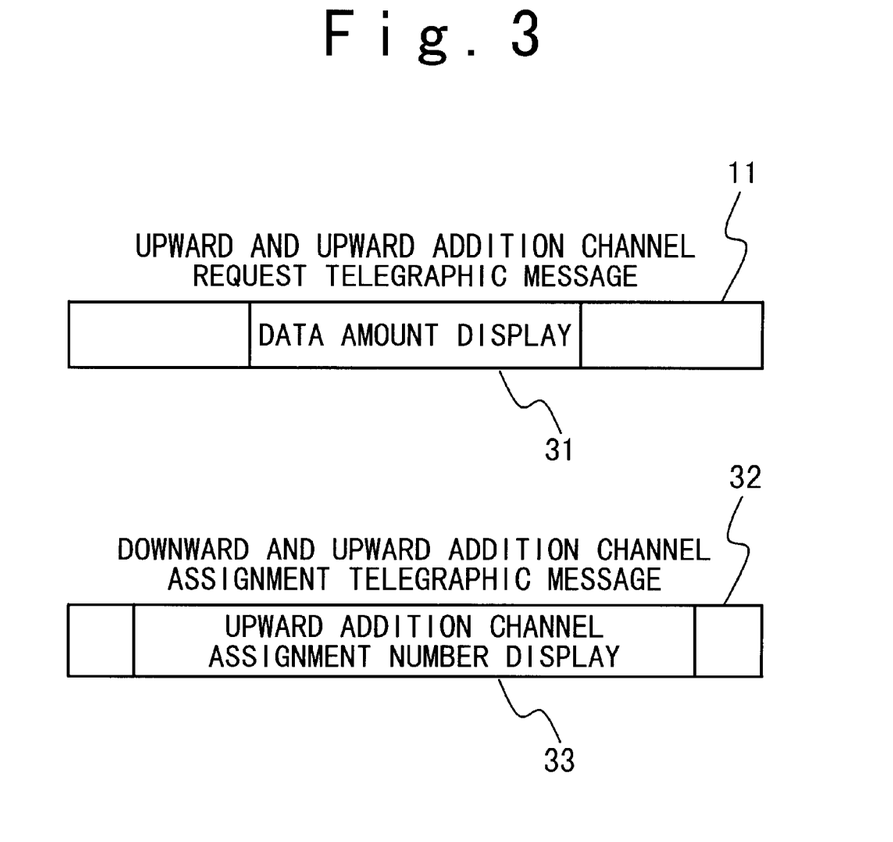
FIG. 3 is a data table showing an upward telegraphic message.

FIG. 2 shows the mobile terminal 1 in detail. Let us suppose that the mobile terminal 1 is already connected through an antenna 6 to the base station 2, via a basic channel. If an upward data 7 to be transmitted is generated in the mobile terminal 1, a data amount calculator 8 calculates its data amount. If the data amount is equal to or less than a threshold, the upward data 7 is transmitted only via the basic channel. Thus, the additional action is not necessary. On the other hand, if the data amount of the upward data 7 is equal to or greater than the threshold, in order to request the base station 2 to use an additional channel, as shown in FIG. 3, its data amount is additionally written to a data amount display 31 of an upward and upward addition channel request telegraphic message 11 generated by a telegraphic message generator 9. Then, the upward and upward addition channel request telegraphic message 11 is transmitted through a transmitter 12, a transmission reception circuit 13 and the antenna 6 to the base station 2.

A downward and upward addition channel assignment telegraphic message is transmitted from the base station 2 through the antenna 6 and the transmission reception circuit 13 to a receiver 14, in response to the upward and upward addition channel request telegraphic message 11. The receiver 14 reads the upward addition channel assignment number. Then, a transmission channel controller 10 uses the basic channel and the addition channel and transmits the upward data 7 to the base station 2. As a result, the data of the addition channel number can be transmitted at a high speed.

Figure 4:
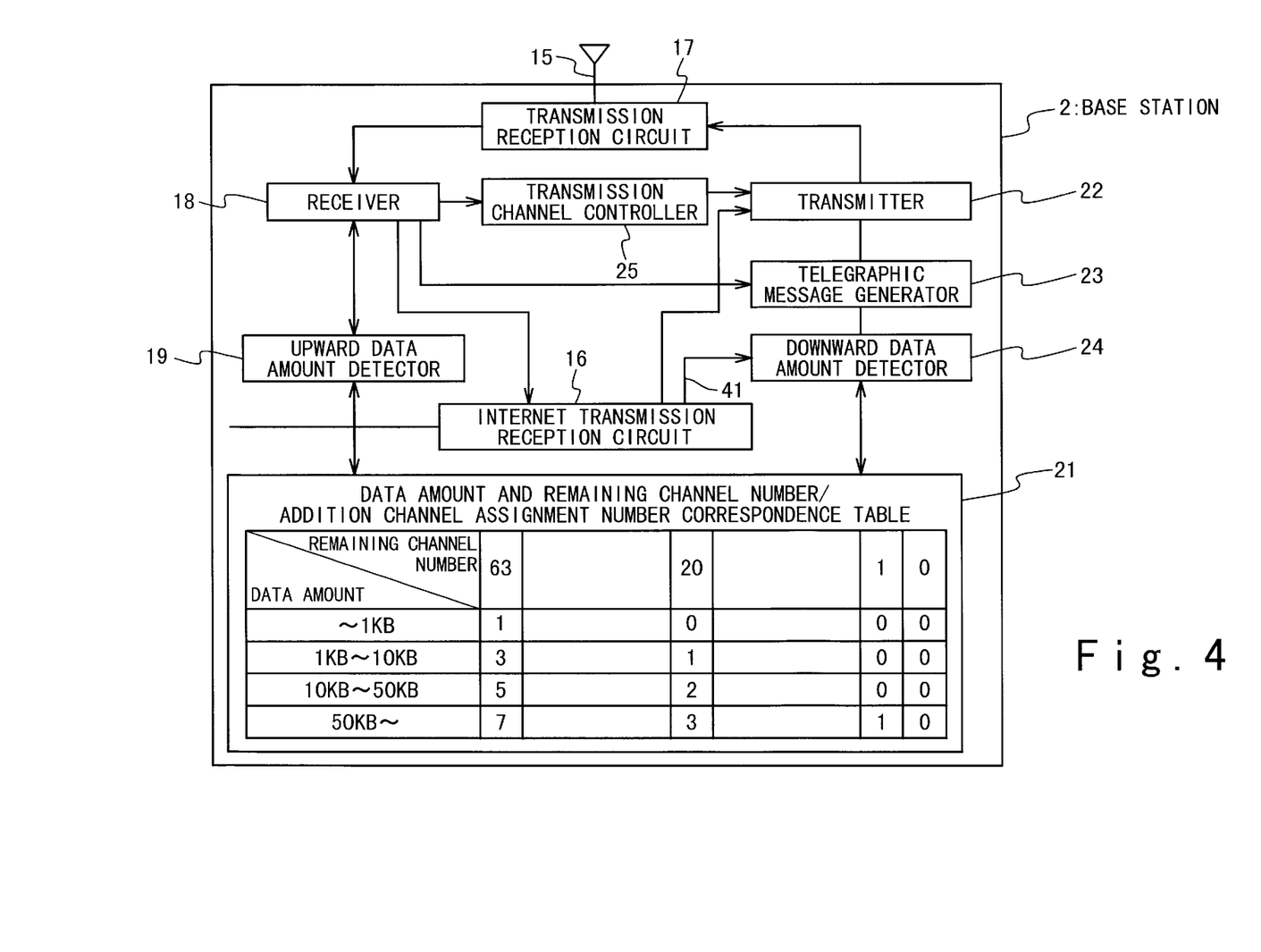
FIG. 4 is a circuit block diagram showing a base station.

FIG. 4 shows the base station 2 in detail. Let us suppose that the base station 2 is already connected through an antenna 15 to the mobile terminal 1 via the basic channel. The base station 2 is connected through an Internet transmission reception circuit 16 to the Internet network 4 and the HOST 5. In the base station 2, if the mobile terminal 1 transmits the upward and upward addition channel request telegraphic message 11 through the antenna 15 and a transmission reception circuit 17 to a receiver 18, an upward data amount detector 19 detects its data amount from a data amount display 31 in the telegraphic message 11, and the upward addition channel assignment number is calculated from a data amount and remaining channel number/addition channel assignment number correspondence table 21.

For example, if it is assumed that a data amount at this time is 2 KB and the number of remaining channels is 63, the number of upward addition channel assignments is 3 channels. However, if it is assumed that the number of remaining channels is 20, the number of upward addition channel assignments is 1 channel. As shown in FIG. 3, the receiver 18 writes this result to an upward addition channel assignment number display 33 of a downward and upward addition channel assignment telegraphic message 32 generated by a telegraphic message generator 23 of the mobile terminal 1. The upward addition channel assignment number is transmitted through a transmitter 22, the transmission reception circuit 17 and the antenna 15 to the mobile terminal 1.

Figure 5:
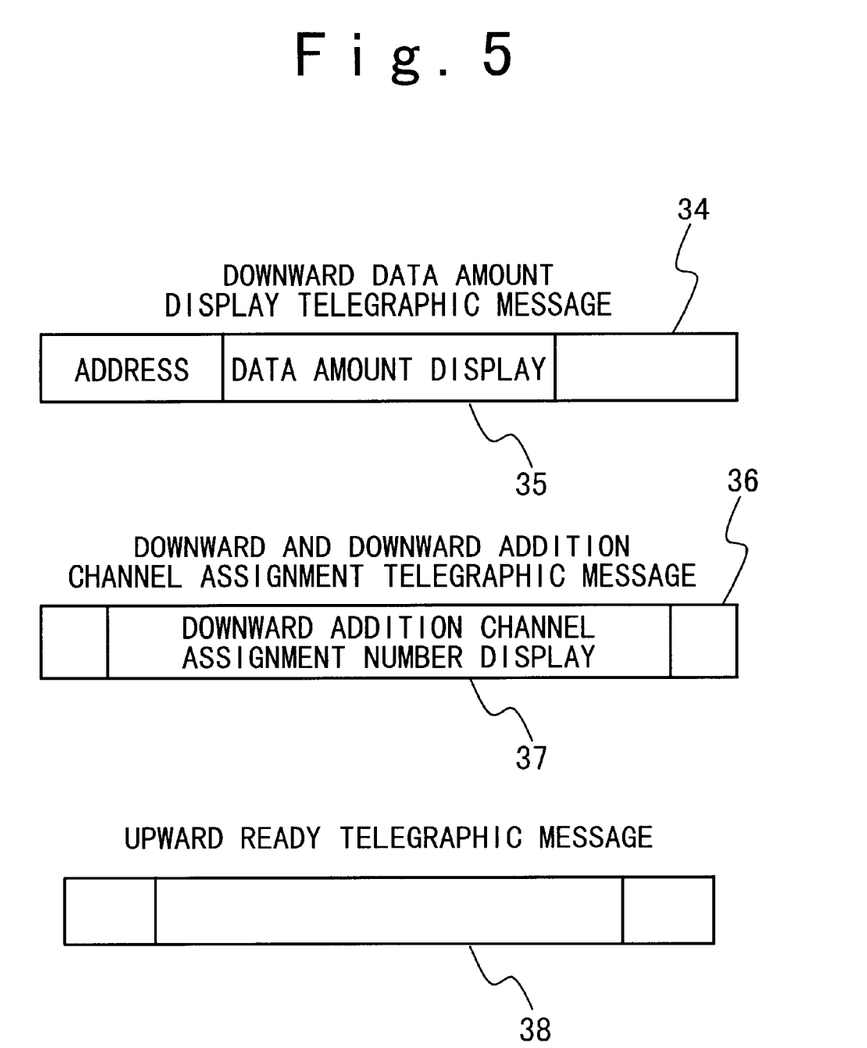
FIG. 5 is a data table showing a downward telegraphic message.

Next, let us suppose that a downward data 41 destined for the mobile terminal 1 is transmitted from the HOST 5 through the Internet network 4 to the base station 2. And, let us suppose that a downward data amount display telegraphic message 34 shown in FIG. 5 is transmitted prior to the actual data reception. The downward data mount display telegraphic message 34 is transmitted through the Internet transmission reception circuit 16 to a downward data amount detector 24. A data amount is detected from a data amount display 35 in the telegraphic message. Then, a downward addition channel assignment number is calculated from the data amount and remaining channel number/addition channel assignment number correspondence table 21.

For example, if it is assumed that the data amount at this time is 30 KB and the number of remaining channels is 63, the number of downward addition channel assignments is 5 channels. However, if it is assumed that the number of remaining channels is 1, the number of downward addition channel assignments is 0 channel, which disables the assignment of the addition channel. This result is written to a downward addition channel assignment number display 37 of a downward and downward addition channel assignment telegraphic message 36 generated by the telegraphic message generator 23. Then, the downward addition channel assignment number is transmitted through the transmitter 22, the transmission reception circuit 17 and the antenna 15 to the mobile terminal 1.

On the contrary, when the mobile terminal 1 transmits an upward READY telegraphic message 38 through the transmission reception circuit 13 and the antenna 6 to the receiver 18 of the base station 2, a transmission channel controller 25 uses the basic channel and the addition channel and transmits the downward data to the mobile terminal 1. Naturally, if the number of downward addition channel assignments is 0, the downward and downward addition channel assignment telegraphic message is not transmitted. By the way, in FIG. 3, the data amount and remaining channel number/addition channel assignment number correspondence table 21 is commonly used in the upward and downward directions. However, it may be respectively separately possessed.

Figure 6:
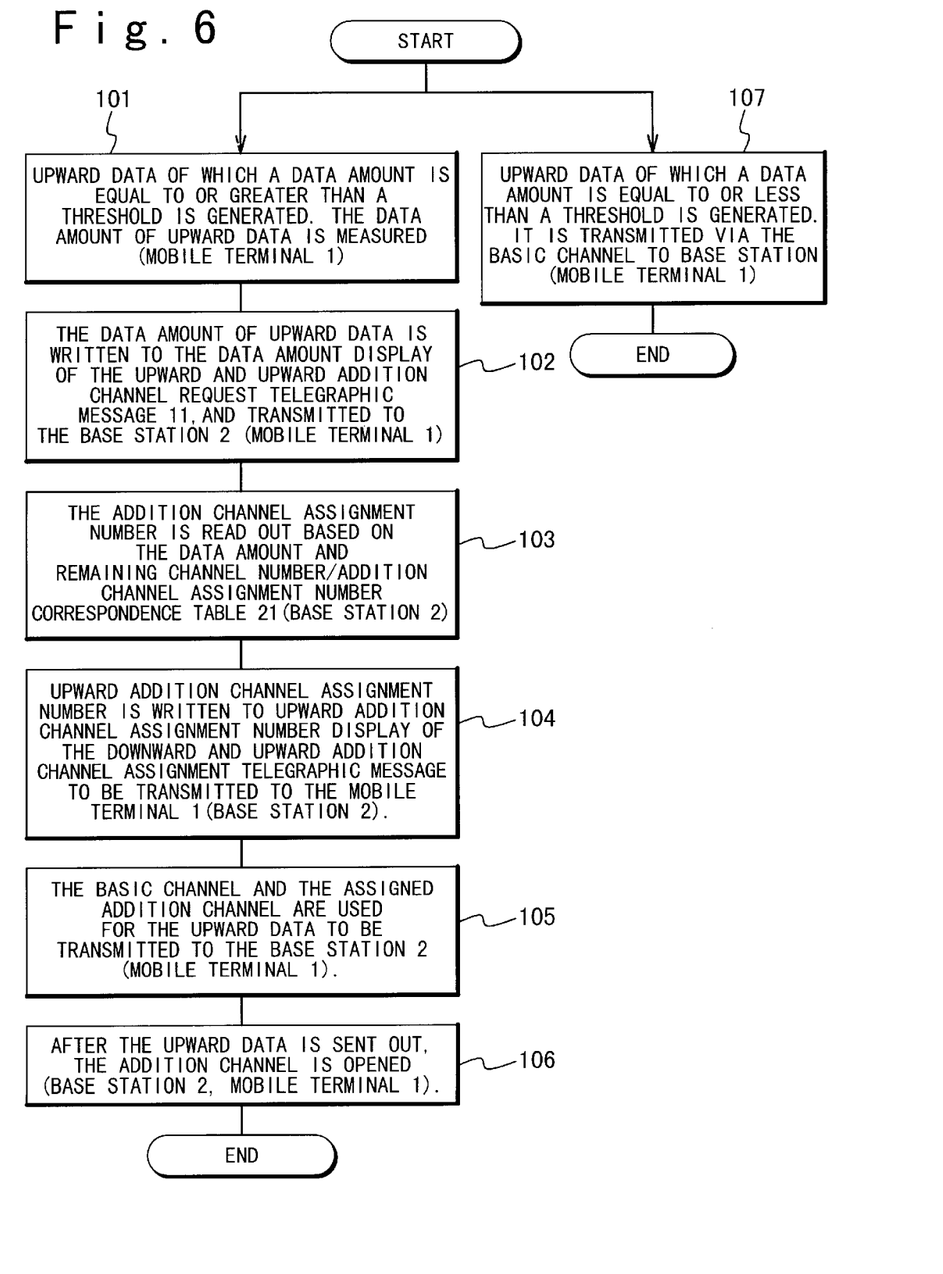
FIG. 6 is an operational flowchart showing an embodiment of a mobile unit communication method according to the present invention.

FIG. 6 shows an embodiment of a mobile unit communication method according to the present invention. FIG. 6 shows a sequence when an upward data is generated in the mobile terminal 1. If a data amount is equal to or less than a threshold, it is transmitted via only the basic channel. Thus, the additional action is not carried out (Procedure 107). If the data amount is equal to or greater than the threshold, the data amount calculator 8 measures the data amount (Procedure 101). Next, this result is written to the data amount display of the upward and upward addition channel request telegraphic message 11, and transmitted to the base station 2 (Procedure 102).

The base station 2 reads out the addition channel assignment number from the data amount and the data amount and remaining channel number/addition channel assignment number correspondence table 21 (Procedure 103). The base station 2 writes this addition channel assignment number to the downward and upward addition channel assignment telegraphic message, and transmits to the mobile terminal 1 (Procedure 104). The mobile terminal 1 uses the basic channel and the assigned addition channel and transmits the upward data to the base station 2 (Procedure 105). After the upward data is sent out, the addition channel is opened (Procedure 106).

Figure 7:
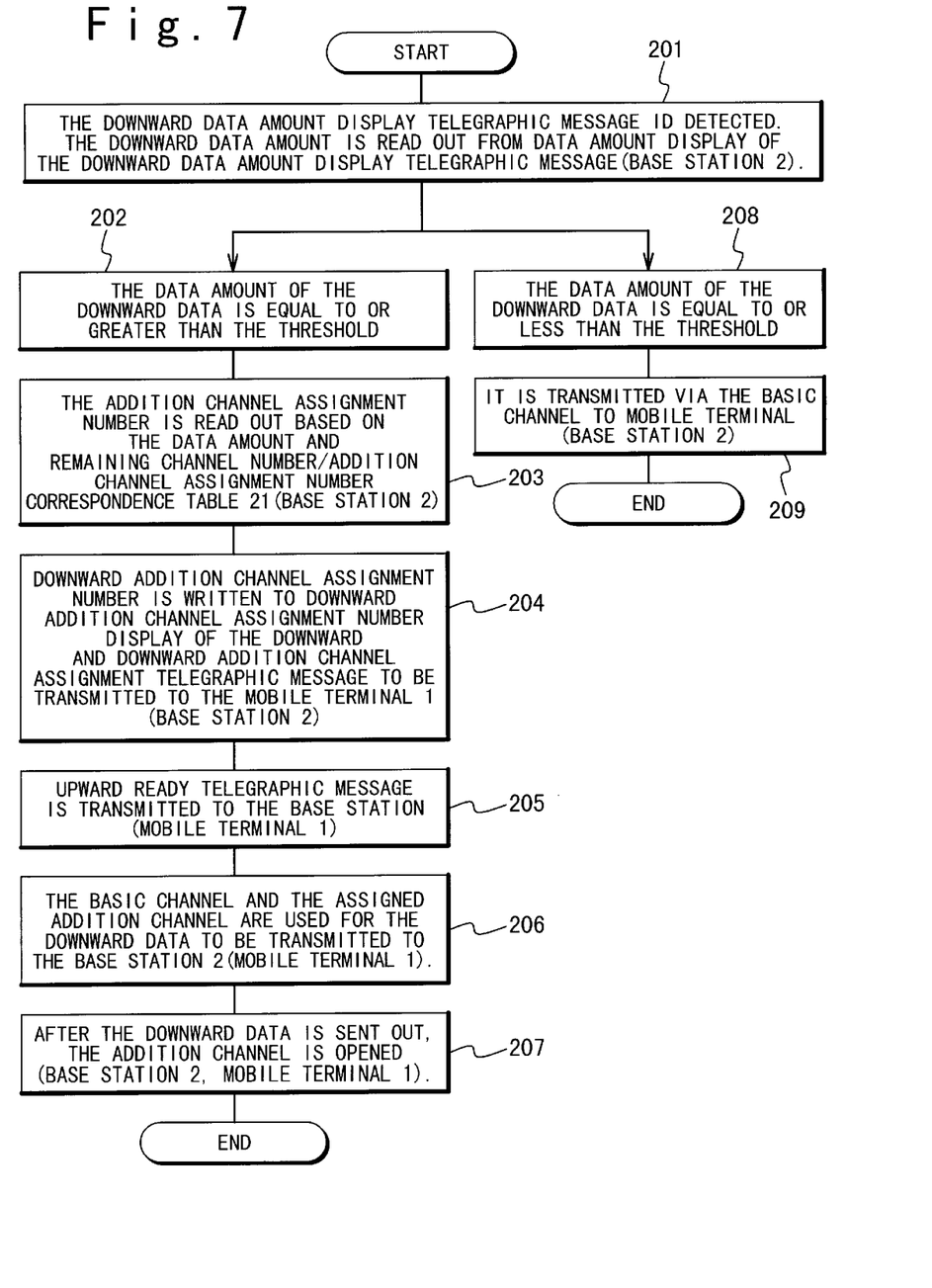
FIG. 7 is an operational flowchart showing another embodiment of a mobile unit communication method according to the present invention.

FIG. 7 shows another embodiment of a communication method of a mobile unit according to the present invention. FIG. 7 shows a sequence when a downward data is generated in the base station 2. Let us suppose that the data is transmitted from the HOST 5 through the Internet network 4 to the mobile terminal 1 and that a downward data amount display telegraphic message 34 indicative of a data amount is transmitted prior to the actual data reception. The base station 2 detects this downward data amount display telegraphic message and reads the downward data amount (Procedure 201). If this downward data amount is equal to or less than the threshold (Procedure 208), it is transmitted via only the basic channel, and the additional action is not carried out (Procedure 209).

If the data amount is equal to or greater than the threshold (Procedure 202), the addition channel assignment number is read out from this data amount and the data amount and remaining channel number/addition channel assignment number correspondence table 21 (Procedure 203). The base station 2 writes this addition channel assignment number to a downward and downward addition channel assignment telegraphic message 36, and transmits to the mobile terminal 1 (Procedure 204). The mobile terminal 1, if the addition channel can be added and received, returns the upward READY telegraphic message 38 to the base station 2 (Procedure 205). The base station 2 uses the basic channel and the assigned addition channel and transmits the downward data to the mobile terminal 1 (Procedure 206). After the downward data is sent out, the addition channel is opened (Procedure 207).

In the mobile unit communication system and the mobile unit communication method according to the present invention, the data is usually transmitted and received via only the basic channel between the mobile terminal and the base station, and the addition channels of the number corresponding to the data amount of the data to be transmitted are added. Then, it is transmitted at the high speed, and after the transmission, the addition channels are opened. Thus, the channel usage efficiency is improved. Moreover, the convenience is made comfortable by increasing or decreasing the number of addition channels to be added, on the basis of the data amount of the data to be transmitted. Moreover, the number of addition channels to be added is increased or decreased on the basis of the congestion condition of the channel between the air blocks. Hence, it is not necessary to reduce the number of simultaneous connection users.

What is claimed is:

1. A mobile unit communication system comprising:

a mobile unit; and a base station, and wherein said mobile unit includes:

a terminal transmit unit transmitting an upward data to said base station;

a terminal receive unit receiving a downward data from said base station; and an upward data amount calculating unit calculating an upward data amount of said upward data, and wherein said base station includes:

a base station receive unit receiving said upward data;

a base station transmit unit transmitting said downward data to said mobile unit; and a detecting unit detecting said upward data amount, and wherein said base station allocates upward additional channels of a number corresponding to said upward data amount detected by said detecting unit in addition to a base channel to said mobile unit, wherein said mobile unit further includes a telegraphic message generating unit generating an upward and upward additional channel request telegraphic message to request to allocate said additional channels, wherein said terminal transmit unit transmits said upward and upward additional channel request telegraphic message to said base station, and wherein said base station includes a table in which the number of said additional channels is determined in reference to a number of remaining channels and said upward data amount.

2. The mobile unit communication system according to claim 1, wherein said additional channels are opened after said upward data is transmitted to said base station.

3. The mobile unit communication system according to claim 1, wherein said base station further includes an internet transmission reception unit connecting to the internet to receive said downward data from the internet, and wherein said detecting unit detects a downward data amount of said downward data received from the internet.

4. The mobile unit communication system to claim 3, wherein said base station allocates downward additional channels allocated based on said downward data amount in addition to said base channel to said mobile unit.

5. A mobile unit communication system comprising:

a mobile unit; and a base station, and wherein said mobile unit includes:

a terminal transmit unit transmitting an upward data to said base station;

a terminal receive unit receiving a downward data from said base station; and an upward data amount calculating unit calculating an upward data amount of said upward data, and wherein said base station includes:

a base station receive unit receiving said upward data;

a base station transmit unit transmitting said downward data to said mobile unit;

a detecting unit detecting said upward data amount; and an internet transmission reception unit connecting to the internet to receive said downward data from the internet, wherein said detecting unit detects a downward amount of said downward received from the internet, wherein said base station allocates upward additional channels of a number corresponding to said upward data amount detected by said detecting unit in addition to a base channel to said mobile unit, wherein said base station allocates downward allocation channels allocated based on said downward data amount in addition to said base channel to said mobile unit, and wherein said base station includes a downward table in which a number of said downward additional channels is determined in reference to a number of remaining channels and said downward data amount.

6. The mobile unit communication system according to claim 5, wherein said mobile unit further includes a telegraphic message generating unit generating an upward and upward additional channel request telegraphic message to request to allocate said additional channels, and wherein said terminal transmit unit transmits said upward and upward additional channel request telegraphic message to said base station.

7. The mobile unit communication system according to claim 6, wherein said base station includes an upward table in which the number of said additional channels is determined in reference to the number of remaining channels and said upward data amount.

8. The mobile unit communication system according to claim 7, wherein said downward table is a same as said upward table.

9. A mobile unit communication method, comprising:

(a) transmitting of a mobile unit an upward data amount of an upward data transmitted from said mobile unit to a base station, to said base station;

(b) allocating of said base station upward channels of a number corresponding to said upward data amount in addition to a base channel to said mobile unit; and (c) transmitting of said mobile unit said upward data with said upward channels to said base station;

(d) allocating of said base station downward channels of a number corresponding to a downward data amount of a downward data transmitted from said base station to said mobile unit in addition to a base channel, to said mobile unit, wherein the allocating step is performed by said base station referencing a table in which the number of said additional channels is determined in reference to a number of remaining channels and said downward data amount; and (e) transmitting of said base station said downward data with said downward channels to said mobile unit.

10. The mobile unit communication method according to claim 9, wherein said step (b) is not performed when said upward data amount is equal to or less than a threshold.

11. The mobile unit communication method according to claim 9, wherein said step (d) is not performed when said downward data amount is equal to or less than a threshold.

12. A mobile unit communicating with a base station, comprising:

a terminal transmit unit transmitting an upward data to said base station;

a terminal receive unit receiving a downward data from said base station;

an upward data amount calculating unit calculating an upward data amount of said upward data; and a telegraphic message generating unit generating an upward and upward additional channel request telegraphic message to request to allocate additional channels, wherein said base station allocates upward additional channels of a number corresponding to said upward data amount in addition to a base channel to said mobile unit, wherein said terminal transmit unit transmits said upward and upward additional channel request telegraphic message to said base station, and wherein said base station references a table in which the number of said additional channels is determined in reference to a number of remaining channels and said upward data amount.

13. The mobile unit communicating with a base station according to claim 12, wherein said additional channels are opened after said upward data is transmitted to said base station.

14. A base station communicating with a mobile unit, comprising:

a base station receive unit receiving an upward data transmitted from said mobile unit;

a base station transmit unit transmitting a downward data to said mobile unit; and a detecting unit detecting an upward data mount of said upward data, and wherein base station allocates upward additional channels of a number corresponding to said upward data amount in addition to a base channel to said mobile unit, wherein said base station includes a table in which the number of said additional channels is determined in reference to a number of remaining channels and said upward data amount.

15. The base station communicating with a mobile unit according to claim 14, wherein said base station further includes an internet transmission reception unit connecting to the internet to receive said downward data from the internet, and wherein said detecting unit detects a downward data amount of said downward data received from the internet.

* * * * *